United States Patent

[11] 3,603,672

| [72] | Inventor | Paul Bastide<br>108 rue de Rennes, Paris, France |
|---|---|---|
| [21] | Appl. No. | 816,994 |
| [22] | Filed | Apr. 17, 1969 |
| [45] | Patented | Sept. 7, 1971 |
| [32] | Priority | Apr. 29, 1968, Mar. 5, 1969 |
| [33] | | France |
| [31] | | 149875 and 6906054 |

[54] DEVICE FOR CONTROLLING THE AMOUNT OF LIGHT RAYS IN OPTICAL INSTRUMENTS
11 Claims, 9 Drawing Figs.

[52] U.S. Cl. .................................................. 350/314, 296/97 G, 350/61, 350/277, 350/283, 350/315, 350/318, 351/47
[51] Int. Cl. .................................................. G02b 5/22
[50] Field of Search ........................................ 351/44, 47, 48, 49; 2/14; 350/283, 315, 318, 314, 61, 277, 276, 279; 296/97.4

[56] References Cited
UNITED STATES PATENTS

| 3,183,033 | 5/1965 | Stulbach...................... | 350/314 X |
| 2,444,512 | 7/1948 | Kath............................ | 350/315 |

FOREIGN PATENTS

| 848,984 | 1939 | France ........................ | 296/97.4 |
| 898,013 | 1944 | France ........................ | 296/97.4 |

*Primary Examiner*—David Schonberg
*Assistant Examiner*—John W. Leonard
*Attorney*—Stevens, Davis, Miller & Mosher

ABSTRACT: The amount or intensity of light rays passing through a lens or transparent sheet, or reflected by a mirror is controlled by winding a film over the lens or mirror, the film having portions throughout its length having different degrees of opacity or different colors.

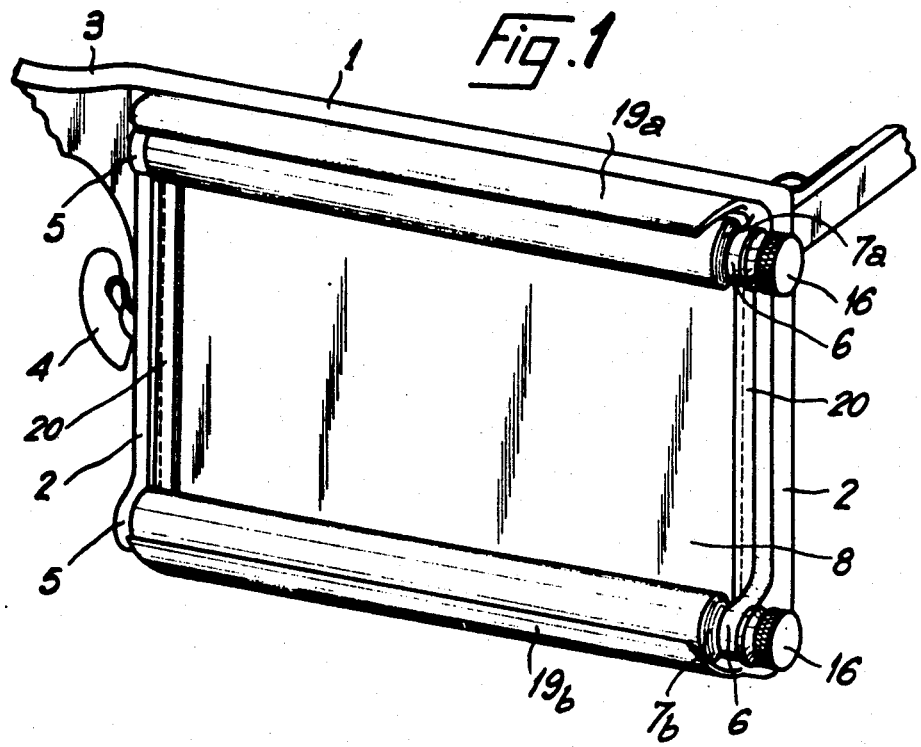
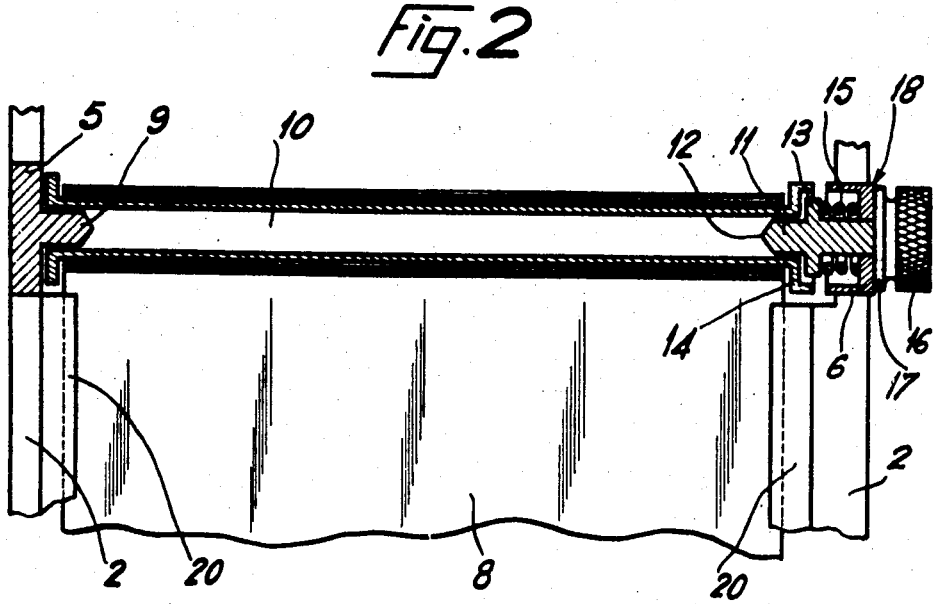

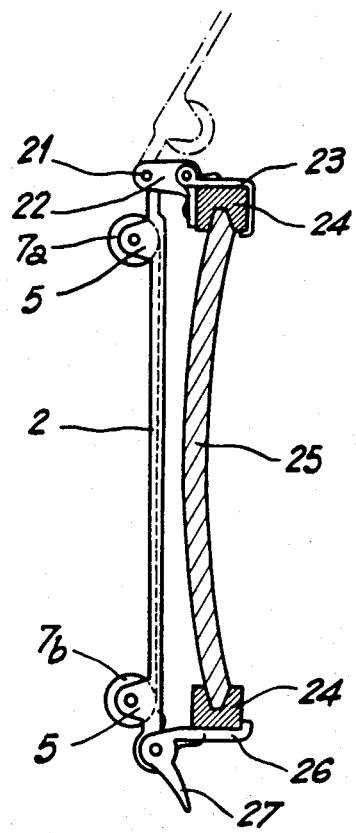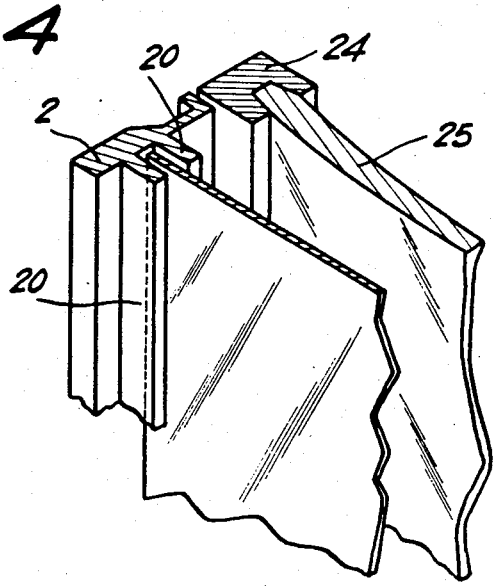

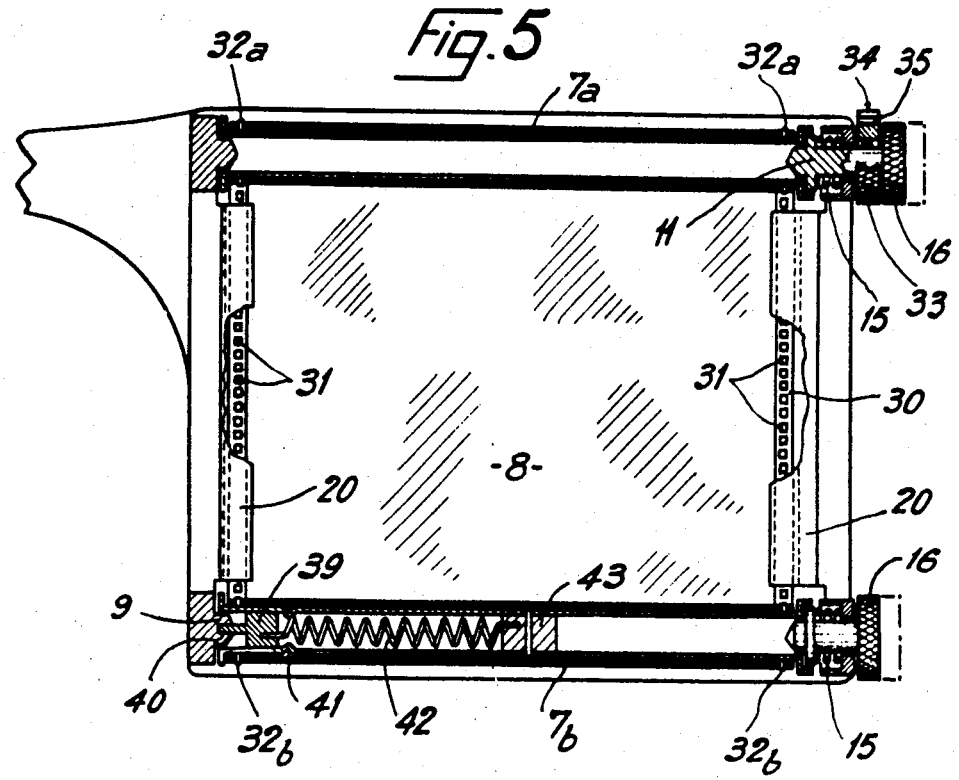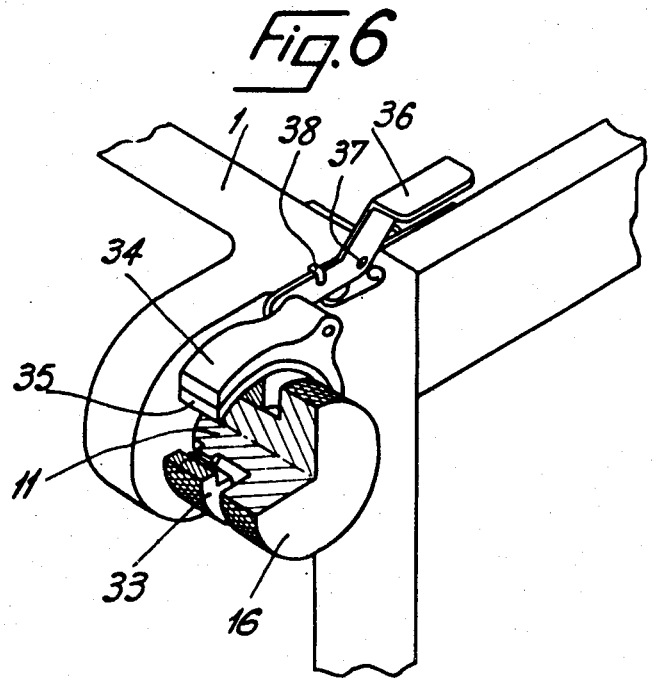

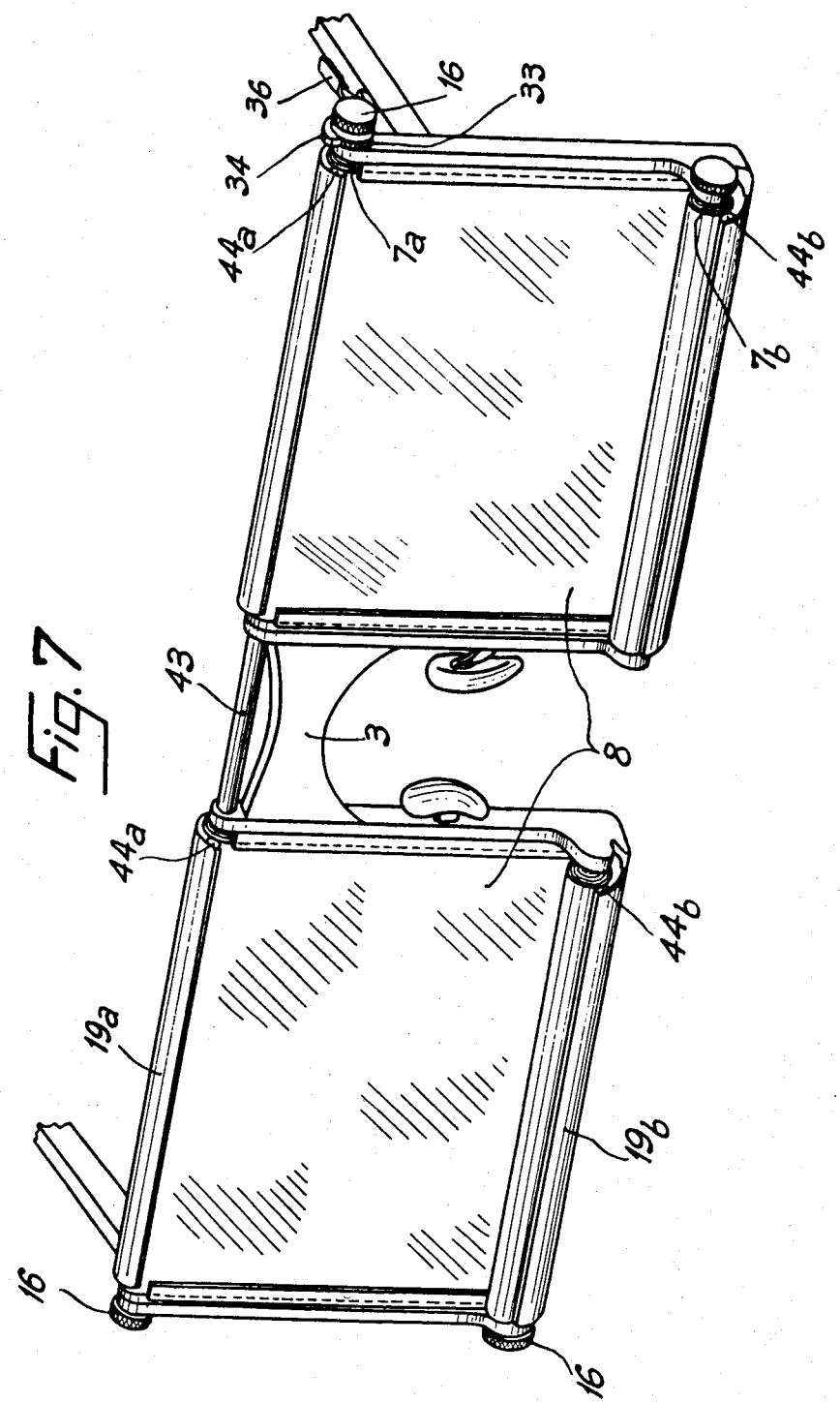

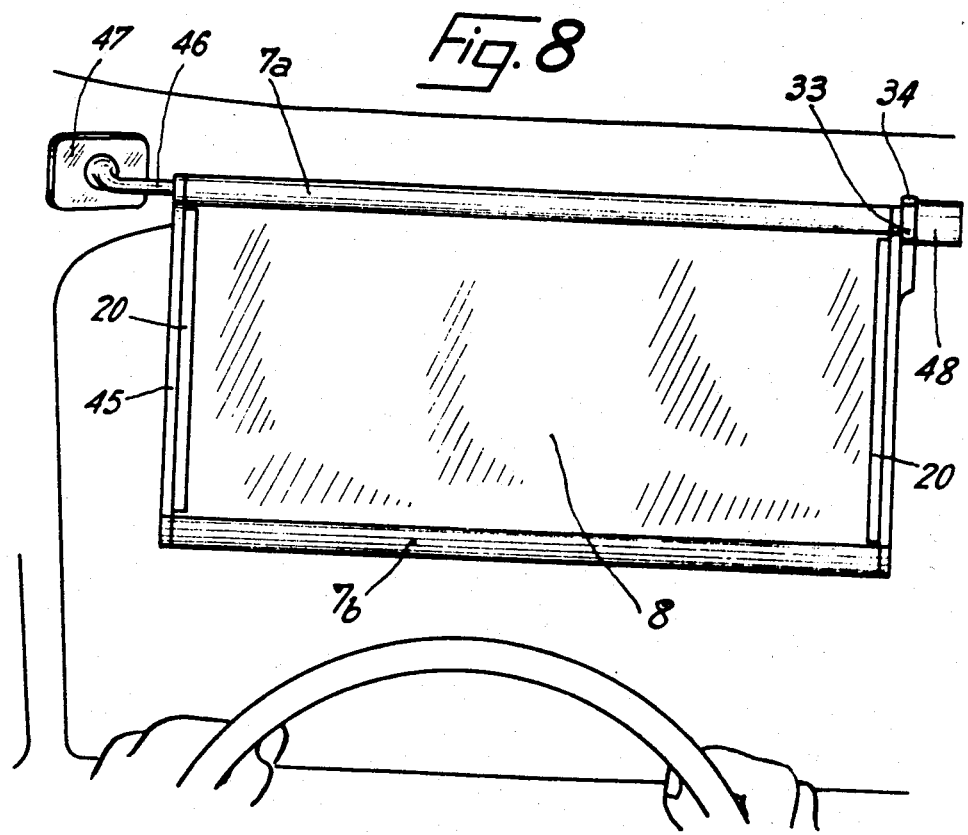
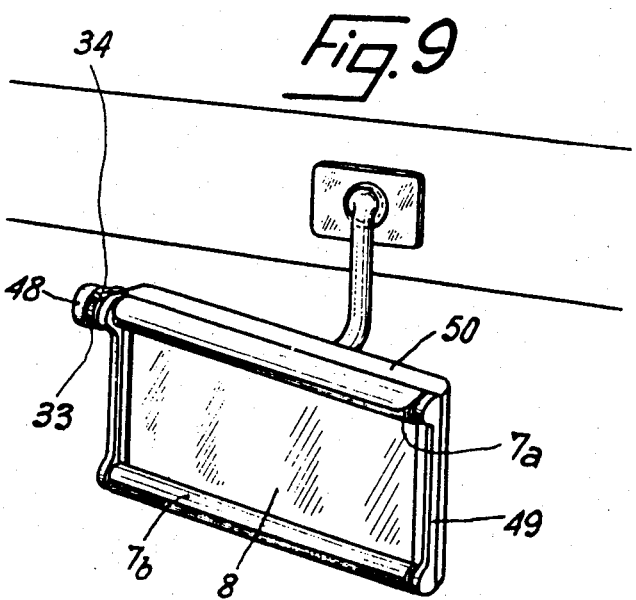

DEVICE FOR CONTROLLING THE AMOUNT OF LIGHT RAYS IN OPTICAL INSTRUMENTS

The present invention has for its object a device which allows the arbitrary regulation of the amount or intensity of light rays issuing from any source and passing through an optical instrument or reflected thereby, especially for the purpose of protecting the vision of the user.

The term "optical instrument" should be understood in its widest sense so as to comprise any instrument or any device through which luminous rays can pass or by which they are reflected.

As an example can be quoted sunglasses, spectacles or corrective glasses, binoculars, telescopes, microscopes, mirrors, open or glass-protected bays, headlamps, searchlights etc.

The present invention provides a device for controlling the amount of light rays passing through an optical instrument comprising a pair of film spools attachable to the said instrument, a film wound on said spools so that the film can be traversed across the face of said instrument, said film having areas throughout its length having different optical characteristics.

The film may, for example, comprise one or more tinted areas the intensity of which varies progressively from almost total opacity to transparency. It may also comprise uniform areas which are however of different opacity.

Means may be provided for controlling in a convenient rapid manner the displacement of the film with the object of positioning it very accurately in the way desired by the user.

The device may be designed in such a way as not to let any light rays, however feeble, pass through it, except those which are filtered by it.

The following description, given with reference to the accompanying drawings and merely by way of a nonlimiting example, will help to understand how the invention can be put into effect.

FIG. 1 is a perspective view which shows, diagrammatically, one half of a pair of spectacles according to one embodiment of the invention and intended for wear by a person with normal vision;

FIG. 2 is a part sectional elevation of a detail showing how a film-carrying spool can be mounted;

FIG. 3 is a vertical section of a film-carrying device, mounted on corrective spectacles;

FIG. 4 is a detail in perspective view, showing the relative positions of film and corrective lens;

FIG. 5 is a diagrammatic elevation, partly in section, of a pair of spectacles according to another embodiment of the invention;

FIG. 6 is a detail in perspective representation and on an enlarged scale of a braking device associated with one of the spools;

FIG. 7 is a perspective view of a pair of spectacles according to a further embodiment of the invention wherein the films serving both eyes are moved by a common mechanism;

FIG. 8 shows, in elevation, the application of the invention to an antiglare screen for a car; and FIG. 9 is a perspective view illustrating the application of the invention to the rearview mirror of a car.

In the embodiment of FIGS. 1 and 2, a pair of spectacles comprises a mount 1 constituted by two frames 2—square or rectangular—which are connected by means of a bridge member 3. The inner parts of the frames, on the inside, may be provided with members 4 for support on the nose.

Near the ends of the horizontal side members of the frames are provided supports 5 and 6 which are either integral with the frame or attached to it and between which there may be mounted thin spools 7a and 7b upon which a film 8 is wound.

As may be gathered from FIG. 2, the supports 5 may comprise a pin 9 which is made to engage in the central bore 10 of the spool, whereas the supports 6 comprise a small key-shaped spindle 11, similar to that used in photographic apparatus.

The spindle 11 is provided with a pin 12 which engages the bore 10 of the spool, and with a diametrical double lug 13 which engages a matching groove 14 provided at the end of the spool. It can be pulled out against the force of a return spring 15 and by means of a knurled knob 16, to enable the spool to be fitted or removed. A brake disc 17 is provided which applies itself against a convenient bearing 18 of the support 6 when the spool is in position.

By actuating one or the other key-shaped spindles 11, the spools can be rotated in one or the other direction, so as to cause the film 8 to travel past the frame aperture and to position the desired film area in front of the eye. The brakes 17, 18 ensure that the film is tensioned between the spools.

In order to avoid open slits between the film 8 and the sides of the frame 2, there are provided, along the horizontal members of the frame and in front thereof, curved shades 19a and 19b, one directed downwardly and the other upwardly, the shades partly enveloping the associated spool and the film wound thereon. The vertical sides of the frame have a groove 20 in which the associated edge of the film 8 moves. Sufficient clearance is left between the shades or the lateral surfaces of the grooves on the one hand and the film on the other, to compensate for displacements of the film during winding and unwinding.

The film 8 has, throughout its length, different characteristics from the point of view of opacity or color, for example. It may be produced of a soft transparent material, for example the same materials as are used in the manufacture of photographic film, or from suitable plastics materials such as polyesters.

The opacity or color may be produced by any convenient process, for example, by the incorporation of fillers or pigments, or by photographic processes. In order to obtain an area in which opacity varies progressively it is possible, for example, to incorporate in the film fillers or pigments of progressively varying density. If a photographic film is used, it is also possible to obtain a print of varying density, for example by letting the film travel past an illuminated slot at varying speed or by letting it travel past a light source of variable intensity at uniform speed, then developing and fixing it. Several areas of different color may also be provided on the same film.

Finally, substances may be incorporated in the film which are meant to stop or filter any radiation considered detrimental, whether within the visible spectrum or not.

In the case of a person obliged to wear corrective glasses constantly or in the case of optical instruments other than spectacles, the film-carrying device is advantageously fitted to the spectacles or other optical instrument in detachable manner.

FIGS. 3 and 4 show a film-carrying device in which the frames 2 which support the spools and the film—the latter being identical with those already described—are hinged on a horizontal shaft 21 to a frame 22. The latter can be fitted to the mount 24 of a pair of ordinary spectacles by means of resilient clips 23 in such a way that these frames may be positioned in front of the glasses 25 or folded up on the forehead of the wearer, as shown by broken lines.

Sprung brackets 26, controlled by small levers 27, allow the frames to connect with the lower part of the mount when it is desired to superimpose the film on the glass.

In the modified embodiment of FIG. 5, the essential elements forming part of the embodiments of FIGS. 1 to 4 are again encountered and bear the same reference numerals.

The film 8 is perforated along its edges which are advantageously reinforced by narrow folded bands 30. Small equidistant holes 31 mesh with teeth 32a and 32b, respectively provided on spools 7a and 7b.

The spindle 11 which serves for holding the upper spool 7a has, parallel with the knurled knob 16 by means of which it is controlled, a small brake drum 33, fitted to it in sliding but nonrotatable manner. This drum cooperates with a shoe 34, provided with a brake lining 35. A lever 36 (FIG. 6), pivoting about with a pin 37 supported by the mount 1 and drawn towards the drum by a spring 38, enables the shoe to be lifted in order that the spool can be freed.

The lower spool 7b contains a small tip 39, not integral with the said spool and provided with a blade similar to that of a screwdriver, which blade engages a diametrical slit 40 of the fixed spool-mounting nipple 9 (FIG. 5). The tip 39, which is prevented from entering deeper into the spool by projections 41, is attached to one end of the torsion spring 42 which latter is attached, at the other end, to a block 43 integral with the spool.

When the upper spool 7a is turned the torsion spring 42 resists. As soon as the upper spool ceases to be actuated it is stopped, immobilized by the brake 33, 34, and the film remains tensioned by the spring 42. When the brake is released when the lever 36 is depressed, the spring 42 tends to return the film to its initial position. The brake could be replaced by a ratchet wheel with a pawl.

In FIG. 7, the upper spools on which are mounted the films of the two frames of a pair of spectacles are coupled to one another by means of a spindle 45 the two ends of which move the said spools in the same way as the previously described spindle 11, so that the two spools are integral with one another during rotation. The spindle of one of the coupled spools is provided with a brake device 33, 34, whereas that of the other spool need only be provided with a simple spindle having a knurled knob 16 which permits the said spool to be removed. The lower spools are both equipped with sprung return mechanism such as the one described above.

For aesthetical reasons, the spindle 43 may be housed within the bridge member 3.

In order to enable the films 8 to be cleaned, the shades 19a and 19b associated with the spools may be provided, on the surface adjacent the film, with a fine strip 44a or 44b of suitable material such as plush or a small brush which may be impregnated with a suitable liquid. Advantageously these shades are joined resiliently to the frame 2, so that the strip 44a or 44b does not normally touch the film. If the film is to be cleaned, slight pressure upon the shade will suffice to establish contact between the strip and the film, and the user, by releasing the brake, can allow the film to roll off slowly so as to be cleaned. The two film ends are wound in opposite senses on their respective spools, as may be gathered from FIG. 7, so that the two shades are enabled to clean each film surface. FIG. 8 shows a device according to the invention, applied to an antiglare screen for a car.

The spools 7a and 7b which support the film 8 are here mounted on a frame 45, hinged in the usual manner on an adjustable shaft 46, the latter being swivel mounted on a support 47 fixed to the vehicle. These spools and their mount can be constructed as has been previously described. Actuation is preferably achieved by means of a small electric motor 48, controlled from the dashboard of the vehicle. If a brake 33, 34, is provided, it may likewise be arranged in such a way as to be controlled from the dashboard.

In FIG. 9 a frame 49 supporting spools 7a and 7b as well as their accessories is provided on the rearview mirror 50 of an automobile. As in the previous case, the film can be actuated by means of a motor 48 associated, if necessary with a brake 33, 34 and controlled from the dashboard. The driver can thus, for example, avoid being blinded by the headlights of a following car, without having to modify the position of the rearview mirror.

The invention may be applied to any instrument or device through which luminous rays are passing or by which they are reflected, for example searchlights, beacons, portholes, mirrors, bays etc.

By incorporating in the films substances which allow any radiation considered damaging or undesirable to be arrested or filtered, it will be possible to protect cosmonauts or workers engaged on special jobs.

Obviously, modifications may be made to the embodiments described here, especially by substituting equivalent technical means, without thereby departing from the scope of the present invention.

I claim:

1. A device for controlling the amount of light rays in an optical instrument comprising in combination: a rectangular frame, a pair of film spools respectively mounted for rotation along opposite sides of said frame, a film stretched across said frame and the ends of which are respectively wound around said spools, said film having an area wherein its permeability to light progressively varies along its length and means for rotating said spools, whereby different portions of said area of said film can be brought into registration with said frame for the purpose specified, and further comprising shades provided along and partly surrounding said spools, and longitudinal grooves engaged by the longitudinal edges of said film provided on the side of said frame along which said spools are not mounted, and wherein cleaning means are supported by said shades partly surrounding said spools, the film being wound on the respective spools in reverse directions such that the cleaning means on each shade cleans one of the film surfaces.

2. A device as claimed in claim 1, wherein the permeability to light of said film varies from opacity to transparency along the said area.

3. A device as claimed in claim 1 wherein said means for rotating said spools comprise a remote-controlled motor.

4. A device according to claim 1, wherein the spools are detachable.

5. A device according to claim 1, wherein the film is perforated at its edges with holes meshing with teeth provided on said spools.

6. A device according to claim 1, further comprising means mounting said cleaning means normally out of contact with the film, including means resiliently mounting said shades on said frame.

7. A device according to claim 1, wherein one of the said spools is provided with a resilient return device while the other said spool is provided with means for immobilizing it in any chosen position.

8. A device according to claim 7, wherein the immobilizing mechanism is a brake.

9. A device according to claim 7 wherein said means for rotating said spools comprise a remote-controlled motor associated to said other said spool.

10. A device according to claim 1 wherein said frame is provided with means for mounting it onto a vehicle.

11. A device according to claim 10 wherein said mounting means are swiveling means allowing to bring said frame before the eyes of an occupant of said vehicle.